Sept. 20, 1960  E. F. PETERSON  2,953,282
MOTOR DRIVEN VIBRATOR
Filed June 19, 1957  2 Sheets-Sheet 1
Fig.1.
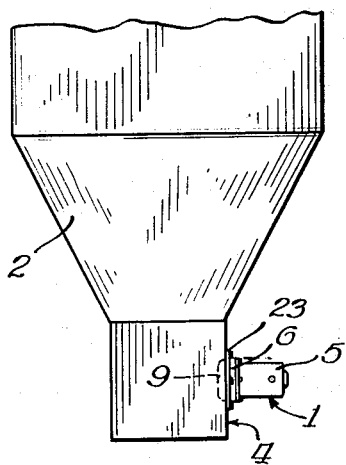
Fig.2.
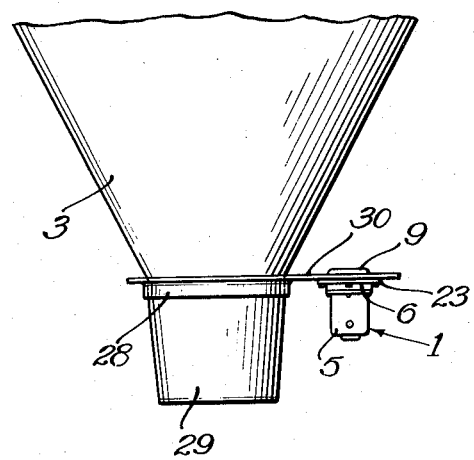
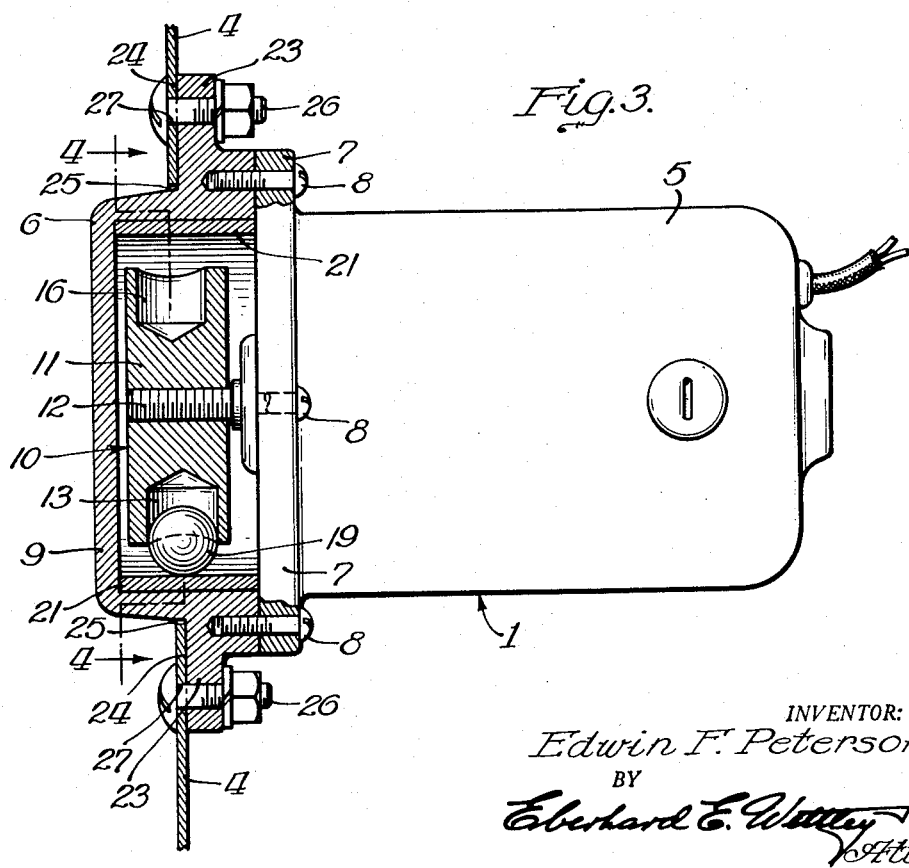
Fig.3.
INVENTOR:
Edwin F. Peterson
BY
Eberhard E. Wittey
Atty.

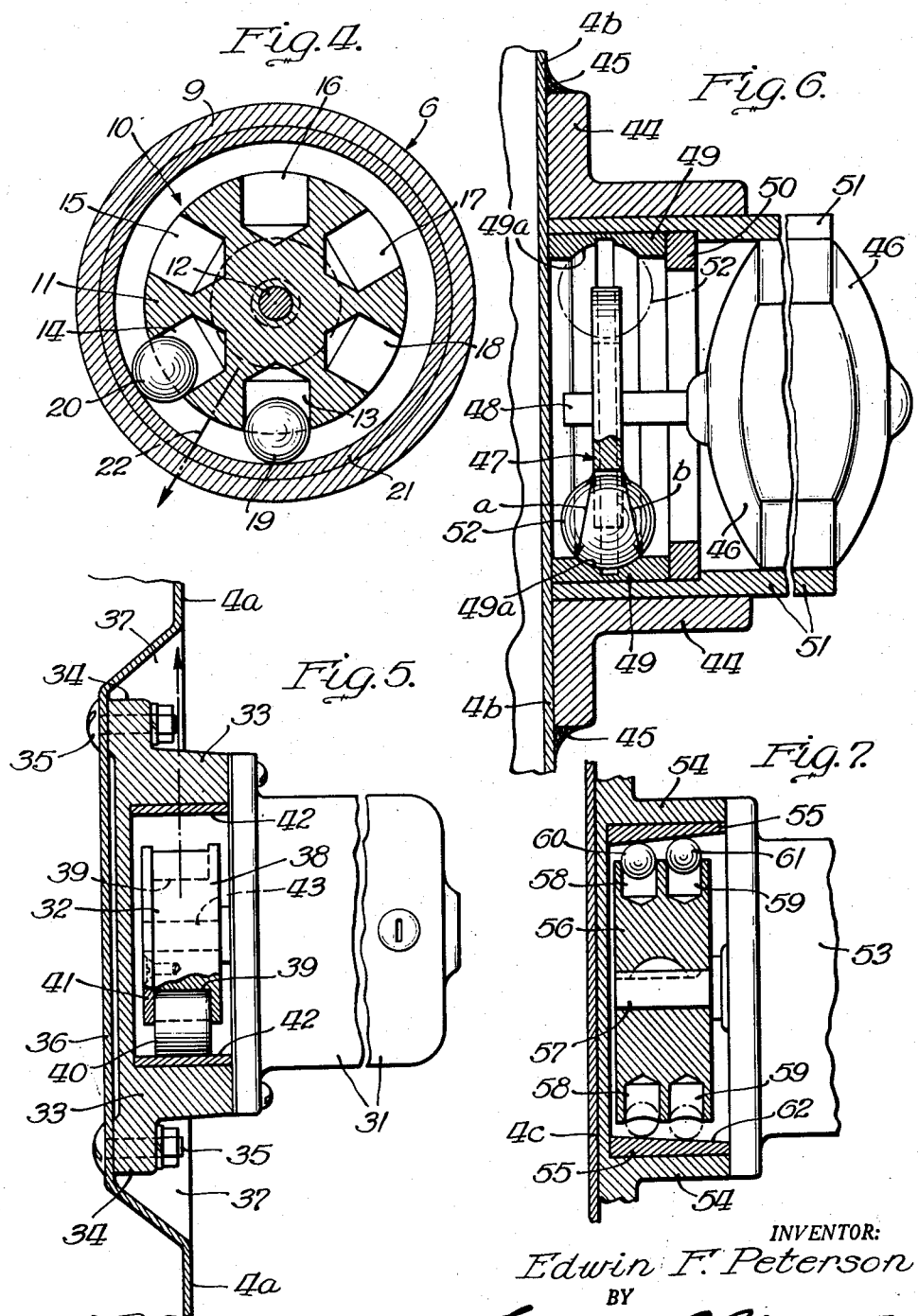

_United States Patent Office_ 2,953,282
Patented Sept. 20, 1960

2,953,282

MOTOR DRIVEN VIBRATOR

Edwin F. Peterson, P.O. Box 151, Neponset, Ill.

Filed June 19, 1957, Ser. No. 666,557

20 Claims. (Cl. 222—196)

This invention relates to mechanical vibratory equipment with self-contained power means.

More specifically the invention relates to a motor driven vibrator provided with weight impelling means to set up off-balanced loads in a given plane of operation including a mounting arrangement to integrate these off-balanced load forces into an associated structure in a given predetermined manner.

It has been found that many industrial vibrators have developed objectionable characteristics when used with light weight equipment such as material conveying ducts, conduits, troughs and similar arrangements primarily constructed from comparatively light weight sheet metals. Vibrations, for example, are transmitted to the sheet metal and largely dissipated in diaphragm action which is noisy and which does not create the type of vibratory action that causes optimum material movement in the conveying means acted upon.

The device of the present invention has as one of its objects the facility of controlling the direction of dissipation of its produced vibrational forces to be effective in a given plane of operation and by reason of its general arrangement and manner of mounting upon a sheet metal wall such vibrational forces are dissipated without diaphragm action and without lateral strain on the associated mounting wall.

Another object of the invention is to provide an electrical motor to drive the vibratory means and to relieve such motor of all unwanted and excessive bearing stresses by the arrangement of the coacting vibration creating elements rendered operative by said motor.

Another object is to locate the coacting vibratory members in a compact but outboard relation with respect to the motor to facilitate the positioning and placement by attachment of the entire motor-vibrator unit in a given relation to a wall of a material conveying structure.

As a further object, this invention provides a vibratory means that does generate its active forces for dissipation in a given plane and a vibratory means that includes a mounting whereby such vibratory means transmits its action substantially in the plane of the wall portion of the attached material conveying structure to thus direct the unbalanced forces in the general direction of the plane of the body of the wall material per se. This prevents all diaphragming and also introduces the vibration transmitting forces directly edgewise into the body of the wall for greater and more active vibration transmittal with greater and more active efficiency. The forces created by the vibratory means travel into the wall in a manner and in a direction in which they do the most good.

Other objects relate to the various mounting arrangements and to certain details of construction of the weight and weight impeller units as they are employed in some of the modified embodiments of the invention.

Still other objects and advantages relating to the motor driven vibrator of the present invention shall hereinafter appear in or become evident from the following detailed description directed to a preferred embodiment and to several modified versions of the vibrator and having reference to the accompanying drawings forming a part of this specification.

In the drawings:

Fig. 1 is a general side elevational view of a material discharging duct or chute incorporating a vibratory means of the character herein disclosed and comprising the device of the present invention;

Fig. 2 is another general side elevational view of a material discharging duct or chute equipped with a vibratory means of the present design and illustrating a somewhat different mounting arrangement;

Fig. 3 is an enlarged side elevational view of the motor driven vibrator of a preferred construction and of a fragmentary portion of the duct of Fig. 1, with certain portions of the vibrator broken away and shown in section;

Fig. 4 is a vertical transverse cross sectional view of the vibratory portion of the unit substantially as viewed along the plane of the line 4—4 in Fig. 3;

Fig. 5 is an illustration of a modified arrangement of motor driven vibrator also showing another type of attachment of the unit with an embossed or recessed wall portion of a sheet metal material carrying structure;

Fig. 6 is a cross sectional view of another motor driven vibrator of a somewhat modified design and having a different mounting; and Fig. 7 fragmentarily illustrates another modified embodiment of a motor driven vibrator having certain other constructional differences that contribute to the efficient and smooth running operation of a device of this character.

With reference to Figs. 1, 2 and 3, the motor driven vibrator is here indicated as a self-contained unit 1 which is attached in Fig. 1 to a wall of a square sheet metal duct or discharge spout 2 and in Fig. 2 to another conical type of duct or discharge spout 3. In Fig. 1, the unit 1 is mounted in a given relation to one of the flat sheet metal walls 4 of the spout 2, this relationship being better illustrated in Fig. 3.

In the latter illustration, the unit 1 comprises as its principal coacting mechanisms, a drive motor 5 and a vibrator assembly 6. Motor 5 is provided with a flange 7 that is secured by means of screws 8 or the like to the vibrator casing 9, the latter together with the adjacent face of the motor providing an enclosed housing for confining the vibratory mechanism 10 therein.

As further portrayed in Fig. 3, the vibrator mechanism includes a rotor or an impeller 11 secured to the motor drive shaft 12. Impeller 11 is provided with a plurality of radial sockets 13, 14, 15, 16, 17 and 18 spaced angularly about its outer periphery and as best shown in Fig. 4. The sockets 13 to 18 are all open radially outwardly of the impeller and selected sockets such as 13 and 14 coact with movable weights which in this case consist of balls 19 and 20 that are of diameters such as to fit with suitable clearance with their diametral portions within the maximum bore diameters of the sockets 13 and 14 as shown in Figs. 3 and 4. The sockets may all occupy positions in a common given radial plane or the sockets may be alternately staggered to either side of this reference plane, if desired, and in the manner best illustrated in Fig. 3.

Upon operation of the device, the motor spins the rotor of impeller 11 which in turn carries the ball or balls employed about the peripheral interior of the casing 9 with centrifugal force keeping the ball or balls in radial outward positions relatively to the respective impeller bores and in rolling contact with the casing 9. A hardened steel sleeve or ball race 21 is suitably fitted into casing 9 to provide a continuous wear resistant surface to accommodate the high speed rotary action of the positively motor driven ball or balls.

The sizes of the balls 19 and 20 may be varied as may their respective rotor or impeller bores. Under certain conditions of operation, only one ball such as 19 may be employed in an opening or socket while under certain other conditions two balls such as 19 and 20 may be used as shown in Fig. 4. The two off-center balls 19 and 20 provide double weights in annularly spaced positions giving a resultant force vector that acts in the general direction and position as the radial line and arrow 22 shown in Fig. 4.

Various gyratory actions may be obtained by using the balls in different bore locations. A single ball is more conducive to sharper vibrations of given magnitudes. Two balls as in Fig. 4 spread the vibrational weight factors giving a heavier and more spread out centrifugal force action. The use of two balls may be carried out in bores 13 and 15 or in any other pair of similarly associated or related bores to obtain a somewhat different intensity and quality of vibration results.

However, in all cases force transmitted by the ball action will be dissipated through the housing of the vibratory assembly 6 in a given plane of action which is generally coincident with the plane of orbital action of the impeller driven ball or balls. None of the centrifugal stresses or radial forces of the balls are transmitted to the motor shaft 12 so that the usual motor bearings and operating parts are not in danger of heavy wear or damage by severe stresses during the operation of this off-center centrifugal force apparatus. It is purely a function of the action of the balls on the race 21 of casing 9 of the vibrator that produces the type of vibration that can be appropriated to many different uses for many different purposes.

A practical and efficient installation of the motor driven vibrator is depicted in Figs. 1 and 3 wherein the objective is to associate the unit 1 with a comparably light weight wall structure such as the sheet metal wall 4 of the spout 2 comprising a polygonal duct structure to impart vibrations to such a structure to insure material passage or discharge.

As best seen in Fig. 3, the casing 9 is provided with an annular flange 23 which is located so as to have its securing face 24 substantially in the centrifugal plane of action of the balls or weights that generate the vibratory action for dissipation and distribution in said plane. Casing 9 protrudes beyond the securing face 24 of flange 23 in a direction away from the motor 5. To accommodate this casing protrusion or projection, a circular opening 25 is cut into the side of wall 4 permitting the face 24 of flange 23 to seat upon the surface of the wall thus automatically orienting the location of the vibratory mechanism 10 to place the latter for action in a plane that is substantially coincident with the plane of the wall 4. A plurality of fastening units such as the bolts 26 are provided to secure flange 23 of casing 9 to wall 4. Appropriate openings 27 are provided or drilled in wall 4 with suitable template guide means or the like that can be suitably registered with the main opening 25 in wall 4.

Operation of the motor driven vibrator will thus generate the orbital forces that are then directly conveyed edgewise into the plane of the mass of the body metal of the sheet metal wall causing the vibrations to be transmitted to the balance of the duct structure walls to obtain the continuous material flow action as engendered by the installation of the vibrator. Any other form of vibrator having force vectors that act angularly or at right angles to a thin sheet metal wall such as 4 would tend to cause diaphragming of the metal wall which would vary in intensity and amplitude depending upon the area of the wall to which such a vibrator has been applied. This would lead to objectionable noise and to low efficiency operation. A great deal of the force of the vibrator would be absorbed in the fanning wall itself and dampened so to speak instead of being directly and positively conveyed or transmitted to the other connected and contiguous wall portions of such a material handling conduit or duct structure.

The vibrator of the present invention may also be applied to material conveying means by association with a mounting unit for vibratory transmission to such a conveying means. Fig. 2 illustrates one such example. The spout or duct 3 is conical making it circular in cross section which thus is devoid of any flat surfaces. A flanged mounting 28 can in that case be secured to the smaller discharge spout end portion 29 with the flanged mounting having a wall as a shelf or ledge 30 projecting laterally away from the conveying means. With this arrangement the vibratory unit 1 can be attached to the wall ledge 30 in a like manner as the unit 1 is attached to wall 4 in Fig. 3. The vibratory results of operation are repeated except that in Fig. 2 the force travels in the plane of the ledge wall to the spout structure to then transmit the vibratory action to the main material carrying means 3.

Referring now to Fig. 5, here the vibratory unit consists of a motor 31 having a vibratory mechanism 32 operating within a housing 33. Housing 33 carries a flange 34 that is coincident with the outer face of the housing and which is secured by bolts 35 to the wall 36 in a recess 37 formed in a conduit or spout wall 4a.

The vibratory mechanism 32 comprises a rotor 38 having semicircular recesses 39 in the periphery thereof to receive a cylindrical roller such as 40 in any one recess thereof. A retaining disc 41 is secured to the face of the rotor to hold the roller in its plane of operation as it travels along a sleeve race 42 in casing 33. Rotor 38 is secured to the motor shaft 43 to be driven by the motor 31.

By employing a cylindrical roller 40 with a greater portion thereof protruding from the rotor or impeller, frictional contact is reduced and heat can be dissipated. A smoother operation results with less roller end surface contact with the recess wall forming parts that contain the associated adjacent portions of the roller.

With the latter arrangement, the offset in the sheet metal wall provides the orientation means for placing wall 4a in line with the gyratory forces that are transmitted by the vibratory mechanism in a plane substantially coincident with wall 4a.

Fig. 6 depicts a flanged ring 44 welded or otherwise secured at 45 to the face of a sheet metal wall 4b. A motor 46 drives a notched disc 47 secured to the motor shaft 48. A concave ball race 49 with spacer ring 50 are housed in a sleeve casing 51 that carries motor 46 and which casing seats within the attaching flanged ring 44. Here the notched disc 47 positively drives a ball 52 along a guide race or track with a relatively small contact engagement of the disc with the ball.

The vibratory action takes place in a plane immediately adjacent the wall 4b and such action is transmitted through the flange ring 44 into the wall 4b for further radial force transmission through the body structure of the wall 4b.

Figure 7 shows another arrangement of vibratory mechanism comprising a motor 53 connected with a housing 54 having a ball race 55, with the motor driving a rotor or impeller 56 by means of the motor shaft 57. The housing 54 is suitably secured to the face of a duct or hopper wall 4c and the rotor operates in a plane parallel and next adjacent to the wall as in the modification shown in Fig. 6.

In this construction the rotor has sets of sockets or bores 58 and 59 annularly positioned about the periphery in spaced planes. One or more balls 60 and one or more balls 61 are used in certain of the sockets in each peripheral group. It should be noted that the ball race 55 is provided with a taper or a slight inclination of its inner annular face 62 which in this case causes a flare to the open side of the race at the motor side thereof. This slight inclination steadies the orbital motion of the balls keeping them rolling in a given path or plane of operation and thus providing a smoother more silent operation of the balls under high speed conditions. It has been found that with certain excess clearance conditions such as may prevail between the balls and their respective sockets and with the use of concentrically surfaced ball races, that serpentine action may result at times particularly under operative vibratory conditions. The serpentine action causes unnecessary noise and rattle. The operation of the device is not affected thereby, but the reduction of noise accompanied by a smoother orbital motion in a given plane under centrifugal conditions does increase the efficiency of the operation of the device.

In a vibrator as in Fig. 7, better wear distribution on the ball race results with smaller and laterally spaced balls operating in the width of the rotor. Another way in which wear can be reduced is to establish the bores as hereinbefore referred to with the bores such as 13 to 18 in Figs. 3 and 4 arranged upon staggered axes spaced alternately laterally with respect to the width of the impeller. Thus the bores 13 and 16 in Fig. 3 are illustrated as displaced out of alignment in radial planes disposed in spaced relation along the axis of the rotor 11 and the ball 19 rolls over one path along race 21 while a ball in bore 16 would roll over another path along the surface of the ball race 21. This staggered positioning of the bores may be such that bores 13, 15 and 17 are drilled in one common plane and bores 14, 16 and 18 are drilled in another common plane about the rotor or impeller 11.

It is to be understood that other spacings of the bores are possible and that different ball applications are possible in the various bores to achieve certain given vibratory results and also to obtain longer operative life by shifting the balls about from worn bores to unused bores as the case may be. With tapered ball races however, wear on the bores may become less objectionable since the balls are under running control on the races and they are not then under the sole guidance or control of the bores in the rotors.

Attention is further directed to certain ball control and retention assembly factors with specific reference to Fig. 6. Should inspection or repair and replacement require the removal of the motor 6 and the vibrator assembly, the entire unit is removed from the flanged ring which is secured to wall 4b. The ball 52 will remain in its operative track due to the relative locations of the notched rotor or disc 47 and the depressed or concave recess 49a in the ball race 49. The distances (a) and (b) in Fig. 6 are smaller than the diameter of the ball 52 so that the ball cannot become accidentally dislodged under any condition on or off of wall 4b without the removal of the driving disc 47 or the ball race 49. The ball will hold its position in its operative plane coincident with the ball race under vibratory action or under off the wall test conditions and will, therefore, never become dislodged or displaced. The ball retention means in the other forms of the invention are somewhat different in character, but equally as effective during assembly or disassembly or under vibratory function and operation.

The foregoing description has been directed to some preferred constructions of the motor driven vibrator of the present invention. Certain changes are contemplated, however, in the exact construction of the individual elements and in the exact combinations thereof in a device of this construction without departing from the fundamental concept of the present invention. The extent of such modifications shall, however, be governed by the breadth and scope of the language in the appended claimed subject matter as directed to the motor driven vibrator of this invention.

What I claim is:

1. Vibratory apparatus for direct physical contact with a light weight wall of a material handling structure, said vibratory apparatus comprising a housing having unbalanced load means therein constructed and arranged to develop off-center forces effective in a predetermined single plane of operation, and securing means to attach one end of said vibratory mechanism housing in a given relation upon the adjacent surface of said wall, said unbalanced load means acting in a plane coincident with the general median plane to orient said force plane with a plane that is substantially coincident with the general median plane of the light weight wall and lying edgewise with respect to the thickness of such wall.

2. Vibratory apparatus having direct physical abutting contact with a thin wall of a material handling structure comprising a rotary vibratory mechanism constructed and arranged to generate force vectors from a given point over a 360° area in a predetermined single plane of operation, and attaching means to mount one end of said vibratory mechanism in a given fixed relation with respect to said thin wall so that the force vectors generated by the vibratory mechanism occur in a plane lying in and parallel to a major surface of said thin wall.

3. In a vibratory apparatus connected with a material handling structure, in combination with a light weight wall portion of said structure, comprising a vibratory means generating force vectors for dissipation in a common plane of operation, mounting means to secure said vibratory means in a given relation with respect to said light weight wall portion, and said light weight wall portion having a deformed section formed in spaced relation with respect to the surface plane of said undeformed portion to receive said mounting means upon the deformed wall portion so that the force vectors generated by the vibratory means occur in a plane lying in and parallel to a major surface of the undeformed part of said light weight wall portion.

4. Vibratory apparatus connected with a thin wall of a material handling structure comprising a casing fixedly secured to the surface of said thin wall, a drive unit supported from said casing, said drive unit having an impeller positioned in the general plane of the wall by said drive unit and for operation within said casing, and free rolling off-center weight members in said casing, said impeller being provided with means to abuttingly drive said weight members about the interiors of said casing to generate unbalanced forces to react through said casing so that the center of gravity of said weight members remains in a plane lying in and parallel to a major surface of said thin wall for direct edgewise vibratory transmission into the plane of the thin wall of said material handling structure.

5. In a vibratory apparatus as in claim 4, wherein said impeller is provided with radially arranged sockets in the periphery thereof and said weight members are partially nested within certain of said sockets for propulsion about and in contact with the interior of said casing.

6. Vibratory apparatus connected with a thin wall of a material handling structure comprising a casing fixedly secured to the surface of said thin wall, a drive unit supported from said casing, said drive unit having an impeller positioned in the general plane of the wall by said drive unit and for operation within said casing, and free rolling off-center weight members in said casing, said impeller being provided with means to abuttingly drive said weight members about the interiors of said casing to generate unbalanced forces to react through said casing for direct edgewise vibratory transmission into the plane of the thin wall of said material handling structure wherein the impeller is provided with sockets formed about the peripheral exterior thereof and opening outwardly thereabout, said weight members being at least partially nested within certain of said sockets for propulsion about the interior of said casing and in contact therewith, and wherein certain of said impeller sockets are staggered axially of the impeller in relation to certain other of said sockets, with certain of said weight members being carried in certain of said staggered sockets of one group while certain of said weight members are carried in certain of said staggered sockets of another of said groups whereby said weight members are driven along spaced paths of contact about the interior of said casing by means of said impeller in the general plane of the adjacent connected thin wall.

7. In a vibratory apparatus, in combination, a single wall to support said apparatus, said vibratory apparatus comprising a power unit, a casing unit, said power unit having a drive shaft disposed in said casing unit, and vibratory mechanism arranged for operation within said casing unit comprising of at least one weight member adapted for bodily motion about the peripheral interior of said casing unit, and a rotor solely supported by said power unit drive shaft to be driven by the latter, said rotor having recessed portions therein to receive said weight member in one of said recessed portions to actuate said member about the casing unit interior, and orientation means on one of said units providing means for fixed attachment with the surface area of said single wall to locate both of said units in a given relation with respect to the wall so as to locate the effective plane of operation of the coacting rotor and weight member to a plane lying in and parallel to a major surface of said supporting wall.

8. A vibratory mechanism, in combination with a wall, comprising a power unit having a drive shaft extending outwardly from one end thereof, a rotary member solely supported upon said drive shaft in outboard relation adjacent said one end of said power unit, a casing secured to said power unit and coacting therewith to provide an enclosure for said rotary member, bodily movable weight elements loosely interposed between said rotary member and a peripheral surface portion of said casing for bodily actuation about said casing by said member, and mounting means to secure said casing against said wall and to position said rotary member and the associated weight elements so that the center of gravity of said weight elements rotates in a plane lying in and parallel to a major surface of said wall.

9. In a vibratory mechanism of the character set forth and defined in claim 8, wherein said rotary member is provided with a notched radially outwardly open peripheral contour, and said weight elements comprise rolling means guided within certain of said notches for operation along given paths about said peripheral surface portion of said casing.

10. In a vibratory mechanism of the character set forth and defined in claim 9, wherein said peripheral surface portion of said casing includes guide means to cause said rolling means to track in a given relation about said casing and with respect to said supporting wall.

11. A vibratory mechanism, in combination with a wall, comprising a power unit having a drive shaft extending outwardly from one end thereof, a rotary member solely supported upon said drive shaft in outboard relation adjacent said one end of said power unit, a casing secured to said power unit and coacting therewith to provide an enclosure for said rotary member, bodily movable weight elements loosely interposed between said rotary member and a peripheral surface portion of said casing for bodily actuation about said casing by said member, and mounting means to secure said casing against said wall and to position said rotary member and the associated weight elements adjacent the plane of said wall, said rotary member being provided with a notched radially outwardly open peripheral contour, said weight elements comprising rolling means guided within certain of said notches for operation along given paths about said peripheral surface portion of said casing, said peripheral surface portion of said casing including guide means to cause said rolling means to track in a given relation about said casing and with respect to said supporting wall, and said peripheral surface portion of said casing being provided with a single tapered face concentrically encircling the axis of said power unit drive shaft to cause said rolling means to track along a given path at the larger diameter portion of said single tapered casing face and as annularly guided therealong by the adjacent surface portions of the notches of said rotary member during the operation of the latter.

12. A vibratory mechanism adapted for securement to a structural wall comprising a power unit having a drive shaft projecting outwardly from one end thereof, an impeller solely mounted upon said drive shaft in outboard relation adjacent said one end of said power unit, a mounting casing connected with said power unit for attachment with said structural wall to position said impeller in a plane immediately adjacent said wall and parallel thereto, said casing providing an annular ball race about said impeller, and rolling members in said casing subject to actuation about said ball race by said impeller so that the center of gravity of said rolling members rotates in a plane lying in and parallel to a major surface of said structural wall, said impeller having round bores opening radially outwardly from the peripheral exterior thereof, and said rolling members being loosely fitted within certain of said bores of said impeller for controlled bodily actuation about said ball race by said impeller.

13. In a vibratory mechanism of the character set forth in claim 12, wherein said impeller is provided with partial cylindrical notches about its periphery located in the axial direction of the impeller, and wherein said rolling members are cylindrical weights partially nested within certain of said cylindrical notches to dispose a greater portion of the surface areas of the weights for friction free operation in relation to said impeller.

14. A vibratory mechanism adapted for securement to a structural wall comprising a power unit having a drive shaft projecting outwardly from one end thereof, an impeller solely mounted upon said drive shaft in outboard relation adjacent said one end of said power unit, a mounting casing connected with said power unit for attachment with said structural wall to position said impeller in a plane immediately adjacent said wall and parallel thereto, said casing providing an annular ball race about said impeller, and rolling members in said casing subject to actuation about said ball race by said impeller, said impeller having round bores opening radially outwardly from the peripheral exterior thereof, and said rolling members being loosely fitted within certain of said bores of said impeller for controlled bodily actuation about said ball race by said impeller, wherein the impeller is a narrow disc having peripheral notches opening radially outwardly of said disc, and wherein said rolling members are considerably larger diametrically than the thickness of said disc for greater friction free surface exposure of said rolling members in relation to said impeller.

15. In a vibratory mechanism as in claim 14, wherein said rolling elements are balls with said narrow disc providing means for circumferential line contact with said balls, and wherein said casing includes guides means for said balls to maintain said impeller driven ball relationship during the operation of the power unit.

16. Vibratory apparatus to transmit vibrations to a wall of a material handling structure comprising a casing fixedly secured in direct surface contact to said wall, a drive unit supported from said casing, said drive unit having an impeller positioned in unsupported relation by said drive unit for operation within said casing, and free rolling off-center spherical weight members in said casing, said impeller being provided with means to abuttingly drive said weight members about the interiors of said casing to generate unbalanced forces to react through said casing for direct transmission into the wall of said material handling structure, and coacting means on said impeller and said casing to counteract displacement of said free rolling weight members out of their normal path of movement comprising certain integral portions on said impeller and a trackway in said casing, said impeller portions being positioned at predetermined distances from said trackway and functioning to prevent dislodgement of said elements out of the plane of said trackway.

17. A vibratory mechanism to transmit vibrations to a wall member comprising a power unit having a drive shaft extending outwardly from one end thereof, a rotary member solely supported upon said drive shaft in outboard relation adjacent said one end of said power unit, a casing secured to said power unit and coacting therewith to provide an enclosure for said rotary member, bodily movable spherical weight elements loosely interposed between said rotary member and a peripheral surface portion of said casing to be actuated about said casing by said member, and mounting means to secure said casing against said wall and to position said rotary member and the associated weight elements in a plane adjacent the plane of said wall, said rotary member being notched for said elements and having a width to engage a diametral portion of said weight elements only, said casing including an annular recess to guide said weight elements in a given plane of operation, the spacing and width of said impeller providing distances between the impeller edges and the lateral limits of said annular recess that are smaller in extent than the diametral portions of said weight elements to prevent dislodgement of said elements out of their normal operative path between said impeller and casing.

18. A conveying apparatus for flowable material comprising, in combination, a material carrying conduit having light weight walls, and a vibratory mechanism devised for direct physical union with one of said light weight conduit walls to vibrate said conduit through said wall to insure material flowage through said conduit, said vibratory mechanism comprising a housing, weight members in said housing, and impelling means to actuate said weight members along a given rotary path in a predetermined plane in said housing to develop off-center force vectors effective in said plane of operation, and securing means on said housing arranged to attach the housing directly to said one conduit wall in a supported relation therefrom so that the center of gravity of said weight members rotates in a plane lying in and parallel to a major surface of said one of said light weight conduit walls to orient the force plane of operation of the weight members in a position substantially coincident with the plane of said one light weight conduit wall and to edgewise dissipate the off-center loads directly into the physical plane of the wall material.

19. A conveying apparatus for flowable material as defined in claim 18 with the addition of an opening in said one conduit wall to accommodate a portion of the housing therethrough, and wherein said securing means extends about said housing for peripheral attachment with said one wall about said wall opening.

20. A conveying apparatus for flowable material as defined in claim 18, wherein said housing is relatively narrow axially to confine said weight members and said impelling means within a narrow plane of action to concentrate the off-center loads in line with the edge physical portions of said one conduit wall.

References Cited in the file of this patent

UNITED STATES PATENTS

| | | |
|---|---|---|
| 2,535,596 | Peterson | Dec. 26, 1950 |
| 2,778,612 | Peterson | Jan. 22, 1957 |

FOREIGN PATENTS

| | | |
|---|---|---|
| 1,054,018 | France | Oct. 7, 1953 |
| 1,054,528 | France | Oct. 7, 1953 |